(12) United States Patent
Takahashi et al.

(10) Patent No.: US 9,251,794 B2
(45) Date of Patent: Feb. 2, 2016

(54) SIGNAL PROCESSING APPARATUS, SIGNAL PROCESSING METHOD, PROGRAM, ELECTRONIC DEVICE, SIGNAL PROCESSING SYSTEM AND SIGNAL PROCESSING METHOD THEREOF

(71) Applicant: Sony Corporation, Tokyo (JP)

(72) Inventors: Shusuke Takahashi, Chiba (JP); Akira Inoue, Tokyo (JP)

(73) Assignee: SONY CORPORATION, Tokyo (JP)

( * ) Notice: Subject to any disclaimer, the term of this patent is extended or adjusted under 35 U.S.C. 154(b) by 293 days.

(21) Appl. No.: 13/761,575

(22) Filed: Feb. 7, 2013

(65) Prior Publication Data

US 2013/0226599 A1 Aug. 29, 2013

(30) Foreign Application Priority Data

Feb. 27, 2012 (JP) ................. 2012-039765

(51) Int. Cl.
| | |
|---|---|
| G10L 21/04 | (2013.01) |
| G10L 19/00 | (2013.01) |
| G11B 27/10 | (2006.01) |
| G11B 27/28 | (2006.01) |
| G10L 19/008 | (2013.01) |

(52) U.S. Cl.
CPC ............... *G10L 19/00* (2013.01); *G10L 21/04* (2013.01); *G11B 27/10* (2013.01); *G11B 27/28* (2013.01); *G10L 19/008* (2013.01); *G10L 19/0017* (2013.01)

(58) Field of Classification Search
USPC .............. 704/501, 504, 200.1, 205, 211, 224, 704/270, 278, 503
See application file for complete search history.

(56) References Cited

FOREIGN PATENT DOCUMENTS

| JP | 2009-10548 | 1/2009 |
|---|---|---|
| JP | 2010-171625 | 8/2010 |

OTHER PUBLICATIONS

Ray Meddis et al. "A unitary model of pitch perception", J. Acoust Soc. Am vol. 102, No. 3, Sep. 1997 pp. 1811-1820.

*Primary Examiner* — Vu B Hang
(74) *Attorney, Agent, or Firm* — Hazuki International, LLC

(57) ABSTRACT

Provided is a signal processing apparatus including a first periodicity detecting section detecting periodicity information of an acoustic signal included in a first content, as first periodicity information, a second periodicity detecting section detecting the periodicity information of an acoustic signal included in a second content, as second periodicity information, a similarity calculating section calculating a similarity between the first periodicity information detected by the first periodicity detecting section and the second periodicity information detected by the second periodicity detecting section, and a synchronization information generating section generating synchronization information used at a time of synchronizing the first content and the second content, based on the similarity calculated by the similarity calculating section.

8 Claims, 14 Drawing Sheets

FIG. 9

A  WHEN INTERNAL CLOCK DIFFERENCE DOES NOT OCCUR AND EDIT IS NOT PERFORMED

| i= | #1 | #2 | #3 | #4 | #5 | #6 | #7 | #8 |
|---|---|---|---|---|---|---|---|---|
| j= | #81 | #82 | #83 | #84 | #85 | #86 | #87 | #88 |

→ TIME

B  WHEN INTERNAL CLOCK DIFFERENCE DOES NOT OCCUR AND EDIT IS PERFORMED ON THE WAY

| i= | #1 | #2 | #3 | #4 | #5 | #6 | #7 | #8 |
|---|---|---|---|---|---|---|---|---|
| j= | #41 | #42 | #43 | #44 | #85 | #86 | #87 | #88 |

→ TIME

C  WHEN INTERNAL CLOCK DIFFERENCE OCCURS AND EDIT IS NOT PERFORMED

| i= | #1 | #2 | #3 | #4 | #5 | #6 | #7 | #8 |
|---|---|---|---|---|---|---|---|---|
| j= | #80 | #81 | #83 | #84 | #86 | #87 | #89 | #90 |

→ TIME

SIGNAL PROCESSING APPARATUS, SIGNAL PROCESSING METHOD, PROGRAM, ELECTRONIC DEVICE, SIGNAL PROCESSING SYSTEM AND SIGNAL PROCESSING METHOD THEREOF

BACKGROUND

The present disclosure relates to a signal processing apparatus, signal processing method, program, electronic device, signal processing system and signal processing method thereof. In particular, the present disclosure relates to a signal processing apparatus, signal processing method, program, electronic device, signal processing system and signal processing method thereof that can generate synchronization information of contents in a robust manner.

In the case of regenerating or editing, in synchronization with time, contents acquired by recording images or sound of the identical event by a plurality of devices, it is requested to find temporal synchronization between the contents. This is because, even in the case of recording images or sound of the identical event, the recording start time varies between the devices and a time delay occurs since the internal clock frequency slightly varies between the devices. Here, the contents denote acoustic data, image data and acoustic data corresponding to image data, and so on.

As a method of generating synchronization information used at the time of synchronizing contents in a temporal manner, there is a method of using time information attached to content files at the time of taking pictures. However, it is not limited that the time information attached to the files at the time of taking pictures is accurate.

Also, as a method of generating synchronization information, there is a method of using the common element of acoustic data included in contents. However, recorded acoustic data includes acoustic data of a wind sound, microphone rubbing sound and other various noise sounds, and therefore there are many cases where the common element is very little.

For example, in a case where only acoustic data recorded in one device includes acoustic data of noise sound or where the acoustic data recorded in each device includes different kinds of noise sounds, the common element is little. Also, although acoustic data recorded in a party location or the like includes acoustic data of BGM (background music) as a common element, since different kinds of conversations are conducted near each device, even in the case of recording the conversations and the BGM in an overlapping manner, the common element becomes little. Especially, in a case where the devices are separated by a distance, the common element is significantly reduced.

Therefore, a method of generating synchronization information in a robust manner with respect to noise sounds is desired.

However, in a method of generating synchronization information using level information of acoustic data, which is disclosed in Japanese Patent Laid-Open No. 2009-10548, it is not possible to generate synchronization information in a robust manner with respect to noise sounds. Also, even in a method of generating synchronization information using a correlation of acoustic data, which is disclosed in Japanese Patent Laid-Open No. 2010-171625, it is not possible to generate synchronization information in a robust manner with respect to noise sounds. Also, in the disclosure of Japanese Patent Laid-Open No. 2010-171625, since a correlation is calculated focusing on only a partial interval of acoustic data, it is not possible to correct a synchronization difference caused over time due to a slight difference of internal clock frequency between devices.

Meanwhile, a method of modeling human's pitch perception and realizing it on a calculator is disclosed in "A unitary model of pitch perception", J. Acoust. Soc. Am. Volume 102, Issue 3, pp. 1811-1820 (1997), Ray Meddis and Lowel O'Mard.

SUMMARY

As described above, although a method of generating synchronization information in a robust manner with respect to noise sounds is desired, such a method has not been considered.

The present disclosure is made in view of such a state and can generate content synchronization information in a robust manner.

According to a first aspect of the present disclosure, there is provided a signal processing apparatus which includes: a first periodicity detecting section detecting periodicity information of an acoustic signal included in a first content, as first periodicity information; a second periodicity detecting section detecting the periodicity information of an acoustic signal included in a second content, as second periodicity information; a similarity calculating section calculating a similarity between the first periodicity information detected by the first periodicity detecting section and the second periodicity information detected by the second periodicity detecting section; and a synchronization information generating section generating synchronization information used at a time of synchronizing the first content and the second content, based on the similarity calculated by the similarity calculating section.

A signal processing method, program and electronic device according to the first aspect of the present disclosure correspond to the signal processing apparatus according to the first aspect of the present disclosure.

According to the first aspect of the present disclosure, periodicity information of an acoustic signal included in a first content is detected as first periodicity information, the periodicity information of an acoustic signal included in a second content is detected as second periodicity information, a similarity between the first periodicity information and the second periodicity information is calculated, and, based on the similarity, synchronization is generated which is used at the time of synchronizing the first content and the second content.

According to a second aspect of the present disclosure, there is provided a signal processing apparatus including a receiving section receiving first periodicity information corresponding to periodicity information of an acoustic signal included in a first content, and second periodicity information corresponding to the periodicity information of an acoustic signal included in a second content, a similarity calculating section calculating a similarity between the first periodicity information and the second periodicity information received by the receiving section, and a synchronization information generating section generating synchronization information used at a time of synchronizing the first content and the second content, based on the similarity calculated by the similarity calculating section.

A signal processing method, program and electronic device according to the second aspect of the present disclosure correspond to the signal processing apparatus according to the second aspect of the present disclosure.

According to the second aspect of the present disclosure, first periodicity information corresponding to periodicity information of an acoustic signal included in a first content and second periodicity information corresponding to the periodicity information of an acoustic signal included in a second content are received, a similarity between the first periodicity information and the second periodicity information is calculated, and, based on the similarity, synchronization information used at the time of synchronizing the first content and the second content is generated.

According to a third aspect of the present disclosure, there is provided a signal processing system including a first periodicity detecting section detecting periodicity information of an acoustic signal included in a first content, as first periodicity information, a second periodicity detecting section detecting the periodicity information of an acoustic signal included in a second content, as second periodicity information, a similarity calculating section calculating a similarity between the first periodicity information detected by the first periodicity detecting section and the second periodicity information detected by the second periodicity detecting section, and a synchronization information generating section generating synchronization information used at a time of synchronizing the first content and the second content, based on the similarity calculated by the similarity calculating section.

A signal processing method according to an embodiment of the present disclosure corresponds to the signal processing system according to an embodiment of the present disclosure.

According to the third aspect of the present disclosure, periodicity information of an acoustic signal included in a first content is detected as first periodicity information, the periodicity information of an acoustic signal included in a second content is detected as second periodicity information, a similarity between the first periodicity information and the second periodicity information is calculated, and, based on the similarity, synchronization information used at the time of synchronizing the first content and the second content is generated.

According to a fourth aspect of the present disclosure, there is provided a signal processing apparatus including a first band dividing section performing a band division on an acoustic signal included in a first content, a first periodicity detecting section detecting periodicity information of the acoustic signal subjected to the band division by the first band dividing section, as first periodicity information, a first periodicity intensity detecting section detecting an intensity of the first periodicity information detected by the first periodicity detecting section, a first periodicity information integrating section integrating the first periodicity information of all bands, based on the intensity of the first periodicity information detected by the first periodicity intensity detecting section, a second band dividing section performing a band division on an acoustic signal included in a second content, a second periodicity detecting section detecting the periodicity information of the acoustic signal subjected to the band division by the second band dividing section, as second periodicity information, a second periodicity intensity detecting section detecting an intensity of the second periodicity information detected by the second periodicity detecting section, a second periodicity information integrating section integrating the second periodicity information of all bands, based on the intensity of the second periodicity information detected by the second periodicity intensity detecting section, a similarity calculating section calculating a similarity between the first periodicity information integrated by the first periodicity information integrating section and the second periodicity information integrated by the second periodicity information integrating section, and a synchronization information generating section generating synchronization information used at a time of synchronizing the first content and the second content, based on the similarity calculated by the similarity calculating section.

According to the fourth aspect of the present disclosure, an acoustic signal included in a first content is subjected to band division, periodicity information of the acoustic signal subjected to the band division is detected as first periodicity information, an intensity of the first periodicity information is detected, the first periodicity information of all bands are integrated based on the intensity of the first periodicity information, an acoustic signal included in a second content is subjected to band division, the periodicity information of the acoustic signal subjected to the band division is detected as second periodicity information, an intensity of the second periodicity information is detected, the second periodicity information of all bands are integrated based on the intensity of the second periodicity information, a similarity between the integrated first periodicity information and the integrated second periodicity information is calculated, and, based on the similarity, synchronization information used at the time of synchronizing the first content and the second content is generated.

According to the present disclosure, it is possible to generate content synchronization information in a robust manner.

BRIEF DESCRIPTION OF THE DRAWINGS

FIG. 9 is a view illustrating an example of synchronization information;

DETAILED DESCRIPTION OF THE EMBODIMENT(S)

Figure 1:
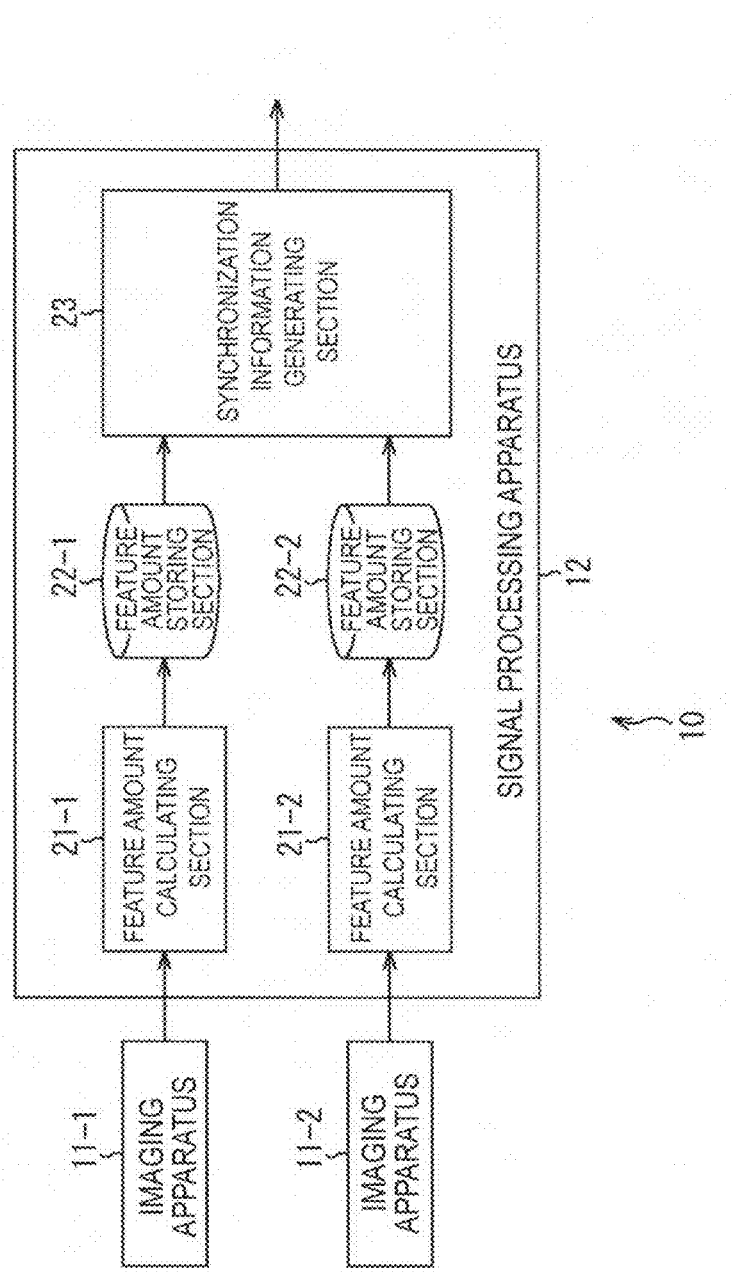
FIG. 1 is a block diagram illustrating a configuration example of a first embodiment of a signal processing system to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

First Embodiment

[Explanation of Outline of First Embodiment of Signal Processing System]

FIG. 1 is a block diagram illustrating a configuration example of a first embodiment of the signal processing system to which the present disclosure is applied.

As illustrated in FIG. 1, a signal processing system 10 includes imaging apparatuses 11-1 and 11-2 and a signal processing apparatus 12.

The imaging apparatus 11-1 includes a video camera or the like. The imaging apparatus 11-1 acquires dynamic images and sounds of the identical event, which are different from those in the imaging apparatus 11-2. The imaging apparatus 11-1 transmits a resulting content A of the dynamic images and sounds to the signal processing apparatus 12.

Similar to the imaging apparatus 11-1, the imaging apparatus 11-2 includes a video camera or the like. The imaging apparatus 11-2 acquires dynamic images and sounds of the identical event, which are different from those in the imaging apparatus 11-1. The imaging apparatus 11-1 transmits a resulting content B of the dynamic images and sounds to the signal processing apparatus 12.

Also, in the following, in a case where the imaging apparatus 11-1 and the imaging apparatus 11-2 are not especially requested to be distinguished from each other, they are collectively referred to as "imaging apparatus 11."

The signal processing apparatus 12 includes feature amount calculating sections 21-1 and 21-2, feature amount storing sections 22-1 and 22-2 and a synchronization information generating section 23.

The feature amount calculating section 21-1 of the signal processing apparatus 12 calculates feature amount time series data based on the acoustic data of the content A supplied from the imaging apparatus 11-1, and supplies it to the feature amount storing section 22-1. Also, the feature amount calculating section 21-2 calculates feature amount time series data based on the acoustic data of the content B supplied from the imaging apparatus 11-2, and supplies it to the feature amount storing section 22-2.

The feature amount storing section 22-1 includes a memory and a hard disk, and so on, and stores the feature amount time series data of the content A, which is supplied from the feature amount calculating section 21-1. Also, the feature amount storing section 22-2 includes a memory and a hard disk, and so on, and stores the feature amount time series data of the content B, which is supplied from the feature amount calculating section 21-2.

The synchronization information generating section 23 reads the feature amount time series data of the content A from the feature amount storing section 22-1 and reads the feature amount time series data of the content B from the feature amount storing section 22-2. The synchronization information generating section 23 generates synchronization information used at the time of synchronizing the contents A and B, based on the feature amount time series data of the content A and the feature amount time series data of the content B. The synchronization information generating section 23 outputs the synchronization information.

Also, in the following, in a case where the feature amount calculating section 21-1 and the feature amount calculating section 21-2 are not especially requested to be distinguished from each other, they are collectively referred to as "feature amount calculating section 21." Also, in a case where the feature amount storing section 22-1 and the feature amount storing section 22-2 are not especially requested to be distinguished from each other, they are collectively referred to as "feature amount storing section 22."

[Configuration Example of Feature Amount Calculating Section]

Figure 2:
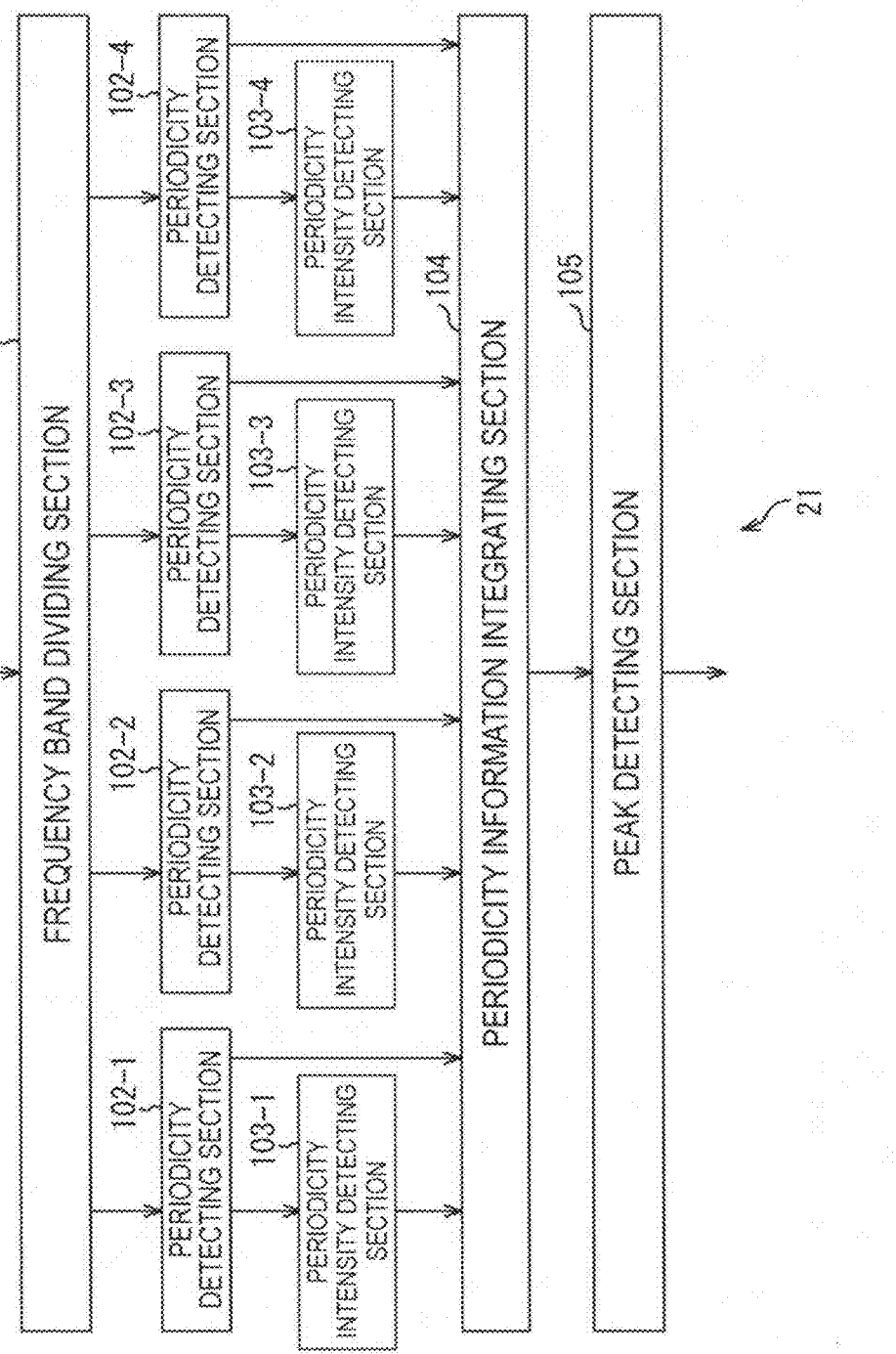
FIG. 2 is a block diagram illustrating a configuration example of a feature amount calculating section in FIG. 1.

FIG. 2 is a block diagram illustrating a configuration example of the feature amount calculating section 21 in FIG. 1.

The feature amount calculating 21 in FIG. 2 includes a frequency band dividing section 101, periodicity detecting sections 102-1 to 102-4, periodicity intensity detecting sections 103-1 to 103-4, a periodicity information integrating section 104 and a peak detecting section 105.

The frequency band dividing section 101 divides the acoustic data of the contents supplied from the imaging apparatus 11 in FIG. 1, into time intervals of around several tens of milliseconds to a hundred milliseconds, using a window function. The frequency band dividing section 101 divides the acoustic data of the time intervals into four frequency bands using a plurality of band-pass filters. The frequency band dividing section 101 supplies the acoustic data of the frequency bands to the periodicity detecting sections 102-1 to 102-4, respectively.

Also, as a band-pass filter, it is effective to use a filter in which the passing frequency bandwidth becomes wider in a higher frequency, such as an octave-band filter.

The periodicity detecting sections 102-1 to 102-4 each extract periodicity information indicating the periodicity per time interval by calculating an autocorrelation function of the acoustic data per time interval in a predetermined frequency band, which is supplied from the frequency band dividing section 101.

Here, as periodicity information, although an autocorrelation function $x(b,\tau)$ of time-shifted acoustic data with an index $\tau$ in a frequency band with an index b is used as is, it is possible to use a value dividing the autocorrelation function $x(b,\tau)$ by $x(b,0)$. Also, as a calculation method of the autocorrelation function $x(b,\tau)$, for example, it is possible to adopt a method using a peak of a spectrum acquired by performing discrete Fourier transform on the acoustic data in a predetermined frequency band.

The periodicity detecting sections 102-1 to 102-4 each supply the periodicity information per extracted time interval to the periodicity intensity detecting sections 103-1 to 103-4 and the periodicity information integrating section 104. Also, in the following, in a case where the periodicity detecting sections 102-1 to 102-4 are not especially necessary to be distinguished from each other, they are collectively referred to as "periodicity detecting section 102."

The periodicity intensity detecting sections 103-1 to 103-4 each calculate the periodicity intensity per time interval, based on the periodicity information per time interval supplied from the periodicity detecting sections 102-1 to 102-4. To be more specific, the maximum value of the autocorrelation function $x(b,\tau)$ corresponding to periodicity information in $\tau$ different from around $\tau=0$, is calculated as the periodicity intensity. As this periodicity intensity is larger, the periodicity of acoustic data of the processing target is more intense, and, as the periodicity intensity is smaller, the periodicity of the acoustic data of the processing target is closer to noise.

Subsequently, the periodicity intensity detecting sections 103-1 to 103-4 each binarize the periodicity intensity per time interval depending on whether it is over a threshold, and use it as periodicity intensity information per time interval. That is, in each time interval, in a case where the periodicity intensity is over a predetermined threshold, the periodicity intensity information is processed as 1, and, in a case the periodicity intensity is equal to or below the predetermined threshold, the periodicity intensity information is processed as 0. The periodicity intensity detecting sections 103-1 to 103-4 each supply the periodicity intensity information per time interval to the periodicity information integrating section 104.

Also, in a case where the periodicity intensity detecting sections 103-1 to 103-4 are not especially requested to be distinguished from each other, they are collectively referred to as "periodicity intensity detecting section 103."

The periodicity information integrating section 104 performs periodicity integration processing of integrating the periodicity information of time intervals, based on the periodicity information per time interval supplied from the periodicity detecting section 102 and the periodicity intensity information per time interval supplied from the periodicity intensity detecting section 103. To be more specific, the periodicity information integrating section 104 finds a total sum of the autocorrelation function x(b,τ) corresponding to the periodicity information per time interval, using following Equation 1.

$$s(\tau) = \frac{1}{N_p} \sum_{b=1}^{N_b} x(b, \tau) \cdot p(b) \qquad (1)$$

Here, in Equation 1, Nb stands for the total number of frequency bands and p(b) stands for periodicity intensity information. Also, Np stands for the number of frequency bands in which the periodicity intensity information p(b) is 1.

The periodicity information integrating section 104 supplies a total sum S(τ) of periodicity information of time intervals, which is acquired as a result of the periodicity integration processing, to the peak detecting section 105.

The peak detecting section 105 performs peak detection on the total sum S(τ) of periodicity information supplied in each time interval from the periodicity information integrating section 104 and generates peak information p(τ) in which a value of peak position $\tau_p$ is 1 and values other than in the peak position $\tau_p$ are 0. As a peak detection method, there is a method of detecting, as the peak position $\tau_p$, an index τ at the time a differential value of the total sum S(τ) of periodicity information changes from a positive value to a negative value.

Also, in a case where the total sum S(τ) of periodicity information in the peak position $\tau_p$ is less than a predetermined threshold, the peak detecting section 105 may set peak information P($\tau_p$) in the peak position $\tau_p$ to 0. By this means, it is possible to reduce a noise of the peak information P($\tau_p$). Also, the peak information may be the total sum S(τ) of periodicity information itself.

The peak detecting section 105 supplies the peak information P(τ) of time intervals as feature amount time series data of time intervals to the feature amount storing section 22 in FIG. 1.

[Example of Feature Amount Time Series Data]

Figure 3:
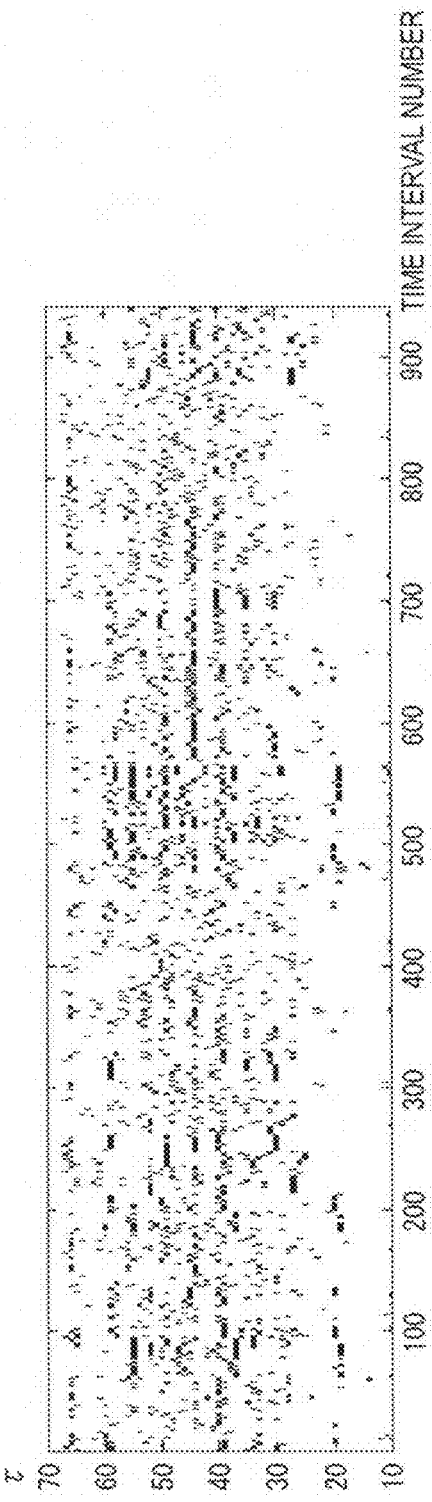
FIG. 3 is a view illustrating an example of feature amount time series data.

FIG. 3 is a view illustrating an example of feature amount time series data.

Here, in the graph in FIG. 3, the horizontal axis represents the time interval number indicating the number of time intervals from the head, and the vertical axis represents the index τ.

The graph in FIG. 3 shows each position of the index τ and the time interval number, in which the time-series data P(τ) of feature amounts is 1, by a black spot. Therefore, in the time-series data P(τ) of feature amounts of acoustic data in a predetermined time interval, in the graph in FIG. 3, the time-series data P(τ) of ti corresponding to points arranged on a line vertical to a position on the horizontal axis corresponding to the time interval number in the time interval is 1 and the time-series data P(τ) of other τ is 0.

[Configuration Example of Synchronization Information Generating Section]

Figure 4:
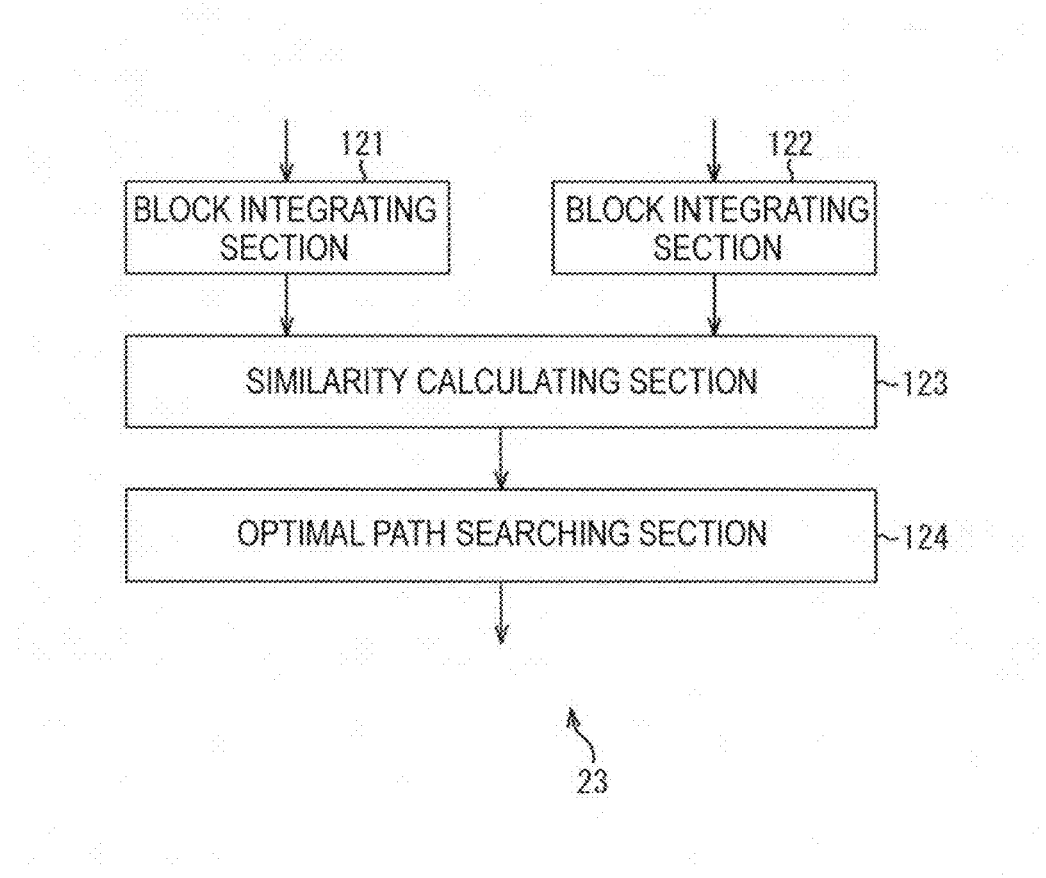
FIG. 4 is a block diagram illustrating a configuration example of a synchronization information generating section in FIG. 1.

FIG. 4 is a block diagram illustrating a configuration example of the synchronization information generating section 23 in FIG. 1.

The synchronization information generating section 23 in FIG. 4 includes block integrating sections 121 and 122, a similarity calculating section 123 and an optimal path searching section 124.

The block integrating section 121 of the synchronization information generating section 23 reads feature amount time series data of time intervals of the content A from the feature amount storing section 22-1 in FIG. 1, and, using consecutive (for example, 64) time intervals as one block, integrates them in units of blocks. The block integrating section 121 supplies the time-series data of block-unit feature amounts to the similarity calculating section 123.

The block integrating section 122 reads feature amount time series data of time intervals of the content B from the feature amount storing section 22-2 in FIG. 1, and, using consecutive (for example, 64) time intervals as one block, integrates them in units of blocks. The block integrating section 122 supplies the time-series data of block-units feature amounts to the similarity calculating section 123.

Here, multiple time intervals forming a block may not be consecutive. For example, it is possible to use multiple even-numbered time intervals as one block or use multiple odd-numbered time intervals as one block. In this case, since it is possible to perform thinning processing on the feature amount time series data of time intervals, it is possible to reduce the computation amount.

Also, the block integrating section 121 and the block integrating section 122 may not integrate all feature amount time series data of the index τ in a time interval, but may partially integrate feature amount time series data of the index τ in the time interval.

For example, in a case where the acoustic data of the contents A and B is acoustic data of sound whose fundamental frequency is between 100 Hz and 500 Hz, the block integrating sections 121 and 122 can integrate only feature amount time series data of the index τ in a time interval, where the index τ corresponds to a time delay of 2 milliseconds to 10 milliseconds.

Also, in a case where the acoustic data of the contents A and B is acoustic data of male voice whose fundamental frequency is between 100 Hz and 250 Hz, the block integrating sections 121 and 122 can integrate only feature amount time series data of the index τ in a time interval, where the index τ corresponds to a time delay of 4 milliseconds to 10 milliseconds. Meanwhile, in a case where the acoustic data of the contents A and B is acoustic data of female voice whose fundamental frequency is between 200 Hz and 500 Hz, the block integrating sections 121 and 122 can integrate only feature amount time series data of the index τ in a time interval, where the index τ corresponds to a time delay of 2 milliseconds to 5 milliseconds.

The similarity calculating section 123 calculates the similarities between the time-series data of block-units feature amounts supplied from the block integrating section 121 and the time-series data of block-units feature amounts supplied from the block integrating section 122, and generates a similarity matrix representing the similarities between these blocks. The similarity calculating section 123 supplies the similarity matrix to the optimal path searching section 124.

The optimal path searching section 124 functions as a synchronization information generating section, and searches an optimal similarity path from the similarity matrix supplied from the similarity calculating section 123 and generates, as synchronization information, information indicating a time difference between two blocks corresponding to the similarity on the path. Subsequently, the optimal path searching section 124 outputs the synchronization information.

As described above, using the peak information $P(\tau)$ per time interval as feature amount time series data, the synchronization information generating section 23 generates synchronization information to synchronize content blocks in which the feature amount time series data is similar. That is, the synchronization information generating section 23 generates synchronization information base on pitch information of acoustic data. Therefore, even in a case where noises included in acoustic data are different between imaging apparatuses, it is possible to generate synchronization information in a robust manner.

That is, in the case of hearing a plurality of sounds having frequency characteristics, by perceiving sounds having the identical fundamental frequency as the common element, that is, by perceiving sounds of the identical pitch as the common element, humans can easily perceive the common element even in a case where noise sounds are included. In view of the above, the present disclosure generates synchronization information in a robust manner with respect to noise sounds by generating the synchronization information based on pitch information.

Figure 5:
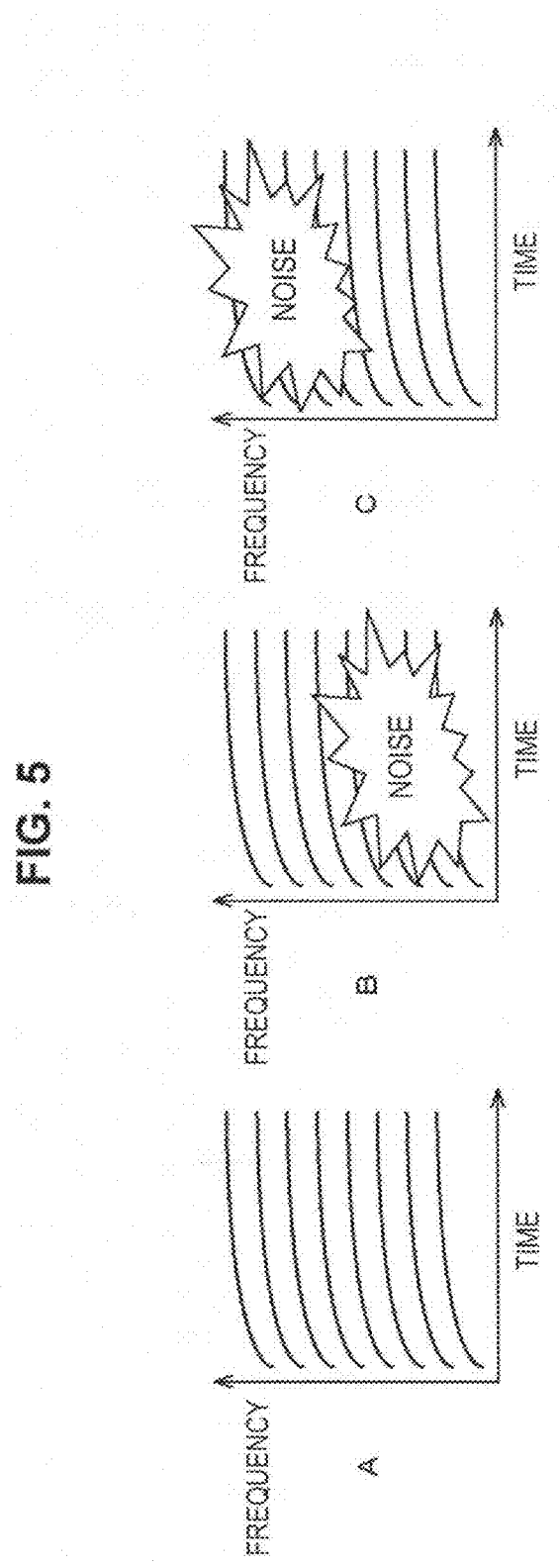
FIG. 5 is a view for explaining acoustic data to which noise sounds of different frequency characteristics are attached.

By contrast with this, as a method of generating synchronization information, there is a method of generating synchronization information using the similarity between spectrums of acoustic data. However, in this method, for example, in two imaging apparatuses, in the case of acquiring acoustic data obtained by attaching noise sounds of different frequency characteristics as illustrated in FIG's. 5B and 5C to the fundamental tone illustrated in FIG. 5A, the common element of spectrums between acoustic data is reduced by the noise sounds. Therefore, it is not possible to accurately calculate the similarity and correctly generate synchronization information. Therefore, in such a method, it is not possible to generate synchronization information in a robust manner with respect to noise sounds.

Here, although synchronization information is generated in units of blocks, synchronization information may be generated with respect to the whole feature amount time series data. However, in a case where synchronization information is generated in units of blocks, as described later, it is possible to correct an internal clock difference between the contents A and B.

[Explanation of Similarity Calculation]

Figure 6:
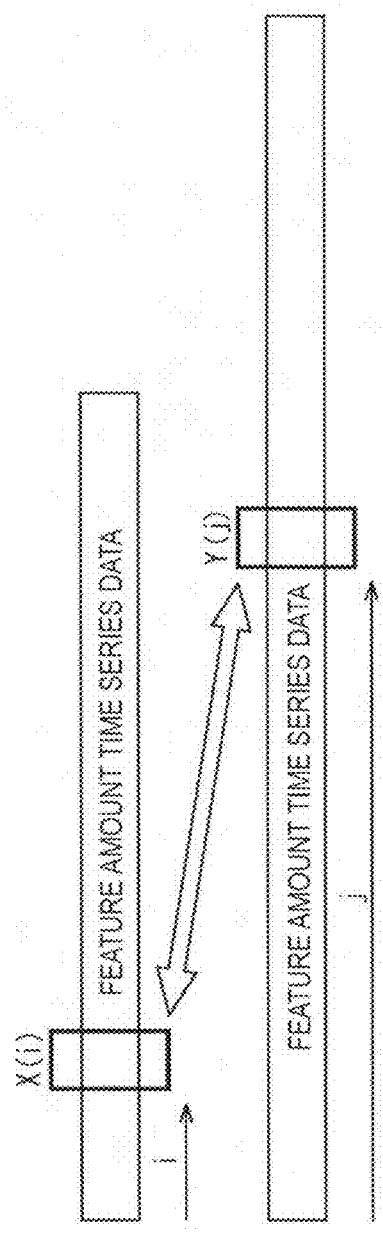
FIG. 6 is a view for explaining blocks for which the similarity is calculated.

FIG. 6 is a view for explaining blocks for which the similarity is calculated.

Here, "i" represents a block index of the content A and "j" represents a block index of the content B. Also, X(i) represents feature amount time series data in the block of the index "i" of the content A, and Y(j) represents feature amount time series data in the block of the index "j" of the content B.

As illustrated in FIG. 6, regarding n items of X(i) and m items of Y(j), there are n×m combinations of similarity calculation targets.

Figure 7:
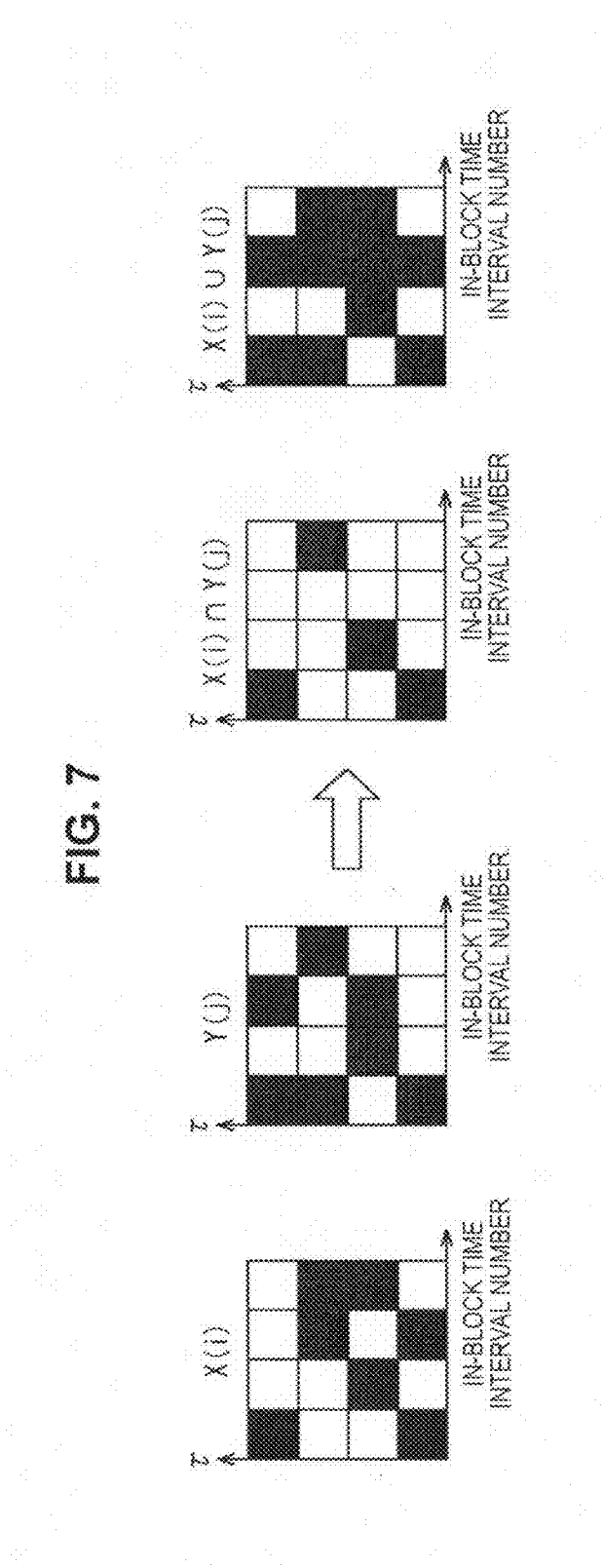
FIG. 7 is a view for explaining a similarity calculation method.

FIG. 7 is a view for explaining a similarity calculation method.

Here, in the matrixes in FIG. 7, the horizontal axis represents the in-block time interval number indicating the number of in-block time intervals from the head, and the vertical axis represents the index $\tau$. Also, a white square represents that the time-series data $P(\tau)$ of feature amounts of the index $\tau$ in a time interval of the corresponding in-block interval number is 0, and a black square represents that the time-series data $P(\tau)$ is 1. Further, in the example in FIG. 7, it is assumed that the number of time intervals forming a block is four and $\tau$ is between 0 and 3.

As illustrated in FIG. 7, in the case of calculating the similarity between X(i) and Y(i), first, a logical multiply X(i)∩Y(j) of X(i) and Y(j) is calculated and a logical add X(i)∪Y(j) of X(i) and Y(j) is calculated. For example, as illustrated in FIG. 7, in the case of calculating the similarity between X(i) and Y(j) which are each formed with nine 0's and seven 1's, first, the logical multiply X(i)∩Y(j) of twelve 0's and four 1's is calculated and the logical add X(i)∪Y(j) of six 0's and ten 1's is calculated.

Subsequently, by following Equation 2, a similarity A(i,j) of X(i) and Y(j) is calculated based on Number(X(i)∩Y(j)) indicating the number of 1's of the logical multiply X(i)∩Y(j) and Number(X(i)∪Y(j)) indicating the number of 1's of the logical add.

$$A(i,j)=\text{Number}(X(i)\cap Y(j))/\text{Number}(X(i)\cup Y(j)) \qquad \text{Equation (2)}$$

In the example in FIG. 7, since Number(X(i)∩Y(j)) is 4 and Number(X(i)∪Y(j)) is 10, the similarity A(i,j) is 0.4.

Also, as feature amount time series data, in the case of adopting the total sum $S(\tau)$ of periodicity information, as a similarity calculation method, it is possible to adopt a method of calculating the similarity using a cosine distance.

[Explanation of Optimal Similarity Path Search]

Figure 8:
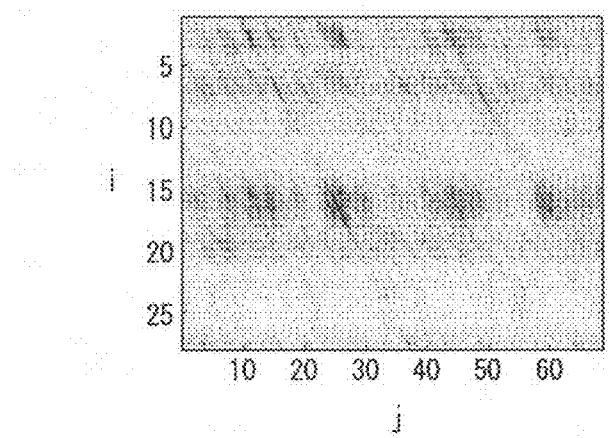
FIG. 8 is a view illustrating an example of a similarity matrix.

FIG. 8 is a view illustrating an example of a similarity matrix.

Also, in the similarity matrix in FIG. 8, the horizontal axis represents an index "j" of a block of the content B and the vertical axis represents an index "i" of a block of the content A.

As illustrated in FIG. 8, in the similarity matrix, a point corresponding to the index "i" and the index "j" is represented by density corresponding to the similarity A(i,j) such that the point becomes deeper as the similarity A(i,j) becomes larger.

Using dynamic programming, the optimal path searching section 124 searches a path in which an integrated value of the path similarities on the similarity matrix is maximum, as an optimal similarity path.

For example, in a case where a time difference between the contents A and B occurs due to only a delay of one of them, since a difference between "i" and "j" to maximize the similarity A(i,j) is constant at any time, a straight path from the upper left to the lower right on the similarity matrix is searched as an optical similarity path. Meanwhile, in a case where an internal clock difference occurs between the contents A and B, an optical similarity path is not straight.

Here, although the optimal path searching section 124 performs a search on all possible paths on the similarity matrix using dynamic programming, in a case where it is found in advance that an internal clock difference does not occur between the contents A and B, the search may be performed on only all possible straight paths on the similarity matrix.

The optimal path searching section 124 generates a difference i-j of indices corresponding to the similarities on the optical similarity path, as synchronization information.

[Example of Synchronization Information]

FIG. 9 is a view illustrating an example of synchronization information.

As illustrated in FIG. 9A, in a case where an internal clock difference between the contents A and B does not occur and both the contents A and B are not edited, that is, in a case where a time difference between the contents A and B occurs due to only a delay of one of them, a constant value is generated as synchronization information. In the example in FIG. 9, a difference between the indices "i" and "j" corresponding to the similarity on an optimal similarity path is "80" at any time and "80" is generated as synchronization information at any time.

Meanwhile, as illustrated in FIG. 9B, in a case where an internal clock difference between the contents A and B does not occur and the content B is edited on the way, respective constant values are generated as synchronization information before an edit point and synchronization information after the edit point. In the example in FIG. 9, there is an edit point in the block with the index "j" of 44. Therefore, although synchronization information indicating a difference between the indices "i" and "j" corresponding to similarities on the optimal similarity path is 40 at any time in a case where the index "j" is between 41 and 44, the synchronization information is 80 at any time in a case where the index "j" is between 85 and 88.

Also, as illustrated in FIG. 9C, in a case where an internal clock difference between the contents A and B occurs and the contents A and B are not edited, a difference between the indices "i" and "j" corresponding to similarities on the optimal similarity path varies so as to correct the internal clock difference. In the example in FIG. 9, although a difference between the indices "i" and "j" is 79 in a case where the index "i" is 1 and 2, since a synchronization difference due to internal clock difference integration becomes large in a case where the index "i" is 3, the difference between the indices "i" and "j" is incremented by 1 and becomes 80. That is, the content B in the block with the index "j" of 82 is cut.

Also, although the difference between the indices "i" and "j" is still 80 in a case where the index "i" is 4, since a synchronization difference due to internal clock difference integration becomes large in a case where the index "i" is 5, the difference between the indices "i" and "j" is incremented by 1 and becomes 81. That is, the content B in the block with the index "j" of 85 is cut.

Further, although the difference between the indices "i" and "j" is still 81 in a case where the index "i" is 6, since a synchronization difference due to internal clock difference integration becomes large in a case where the index "i" is 7, the difference between the indices "i" and "j" is incremented by 1 and becomes 82. That is, the content B in the block with the index "j" of 88 is cut. Subsequently, in a case where the index "i" is 8, the difference between the indices "i" and "j" is still 82.

Therefore, "79" is generated as synchronization information in blocks with the index "i" of 1 and 2, and "80" is generated as synchronization information in blocks with the index "i" of 3 and 4. Also, "81" is generated as synchronization information in blocks with the index "i" of 5 and 6, and "82" is generated as synchronization information in blocks with the index "i" of 7 and 8.

[Processing in Signal Processing Apparatus]

Figure 10:
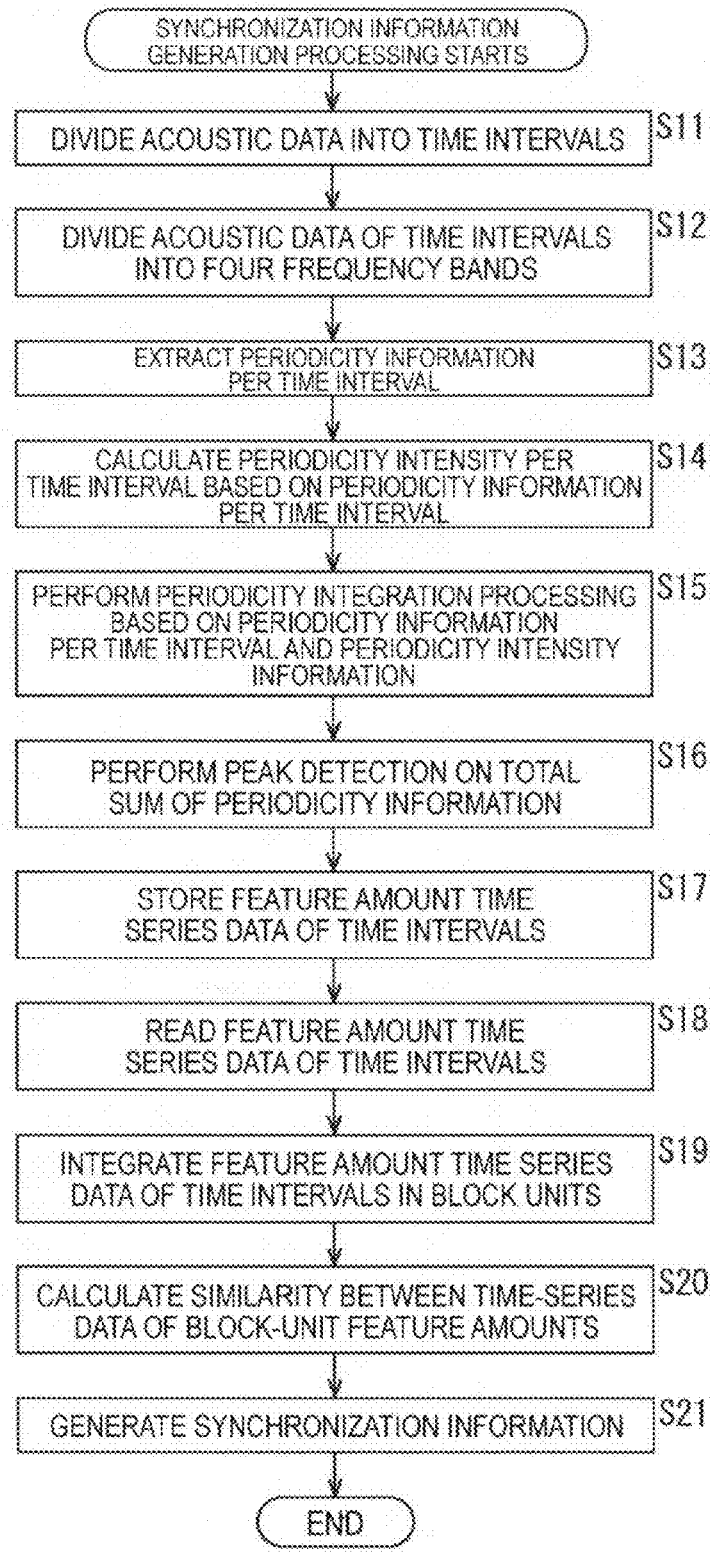
FIG. 10 is a flowchart for explaining synchronization information generation processing in the signal processing apparatus in FIG. 1.

FIG. 10 is a flowchart for explaining synchronization information generation processing in the signal processing apparatus 12 in FIG. 1. This synchronization information generation processing starts when a content is input from the imaging apparatus 11.

Also, the processing in steps S11 to S17 in FIG. 10 is performed every content.

In step S11 in FIG. 10, the frequency band dividing section 101 divides the acoustic data of contents supplied from the imaging apparatus 11 in FIG. 1, into time intervals of around several tens of milliseconds to a hundred milliseconds, using a window function.

In step S12, the frequency band dividing section 101 divides the acoustic data of the time intervals into four frequency bands using a plurality of band-pass filters. The frequency band dividing section 101 supplies the acoustic data of the frequency bands to the periodicity detecting sections 102-1 to 102-4, respectively.

In step S13, the periodicity detecting section 102 extracts periodicity information of time intervals by calculating an autocorrelation function $x(b,\tau)$ of the acoustic data per time interval in a predetermined frequency band, which is supplied from the frequency band dividing section 101, and sup-plies the periodicity information to the periodicity intensity detecting section 103. Here, the processing in step S13 is performed every periodicity detecting section 102.

In step S14, the periodicity intensity detecting section 103 calculates the periodicity intensity per time interval, based on the periodicity information of time intervals supplied from the periodicity detecting section 102. Subsequently, the periodicity intensity detecting section 103 binarizes the periodicity intensity per time interval depending on whether it is over a threshold, and generates and supplies periodicity intensity information per time interval to the periodicity information integrating section 104. Here, the processing in step S14 is performed every periodicity intensity detecting section 103.

In step S15, using above Equation 1, the periodicity information integrating section 104 performs periodicity integration processing based on the periodicity information of time intervals supplied from the periodicity detecting section 102 and the periodicity intensity information per time interval supplied from the periodicity intensity detecting section 103. The periodicity information integrating section 104 supplies a total sum $S(\tau)$ of the periodicity information of time intervals, which is acquired as a result of the periodicity integration processing, to the peak detecting section 105.

In step S16, the peak detecting section 105 performs peak detection for the total sum $S(\tau)$ of periodicity information supplied in each time interval from the periodicity information integrating section 104 and generates peak information $p(\tau)$.

In step S17, the peak detecting section 105 supplies the peak information $P(\tau)$ of time intervals as feature amount time series data of time intervals to the feature amount storing section 22 in FIG. 1.

In step S18, the block integrating section 121 of the synchronization information generating section 23 reads the feature amount time series data of time intervals of the content A, which is stored in the feature amount storing section 22-1 in FIG. 1 in step S17. Also, the block integrating section 122 reads the feature amount time series data of time intervals of the content B, which is stored in the feature amount storing section 22-2 in FIG. 1 in step S17.

In step S19, using consecutive (for example, 64) time intervals as one block, the block integrating section 121 integrates the feature amount time series data of time intervals of the content A in units of blocks and supplies the results to the similarity calculating section 123. Also, using consecutive (for example, 64) time intervals as one block, the block integrating section 122 integrates the feature amount time series data of time intervals of the content B in units of blocks and supplies the results to the similarity calculating section 123.

In step S20, the similarity calculating section 123 calculates the similarities between the time-series data of block-units feature amounts supplied from the block integrating section 121 and the time-series data of block-units feature amounts supplied from the block integrating section 122, and generates a similarity matrix representing the similarities between these blocks. The similarity calculating section 123 supplies the similarity matrix to the optimal path searching section 124.

In step S21, the optimal path searching section 124 searches an optimal similarity path from the similarity matrix supplied from the similarity calculating section 123 and generates synchronization information. Subsequently, the optimal path searching section 124 outputs the synchronization information.

As described above, in the signal processing system 10, since the signal processing apparatus 11 generates the synchronization information based on the periodicity information, it is possible to generate the synchronization information in a robust manner.

Here, for example, a block subsequent to the signal processing system 10 continually compares the playback positions of the contents A and B, and, using the synchronization information, checks whether a synchronization difference occurs. Also, in a case where a synchronization difference occurs, by changing the playback position of one of the contents A and B using the synchronization information, the block subsequent to the signal processing system 10 corrects the synchronization difference between the contents A and B. At this time, if the content is simply thinned, since a discontinuous point occurs at the thinning point and a noise occurs, it is desirable to use a method of warping only time while maintaining a steady pitch.

Thus, by correcting the synchronization difference between the contents A and B, the block subsequent to the signal processing system 10 can perform a synchronization edit of the contents A and B and output acoustic data of one of the contents A and B instead of acoustic data of the other.

Second Embodiment

[Explanation of Outline of Second Embodiment of Signal Processing System]

Figure 11:
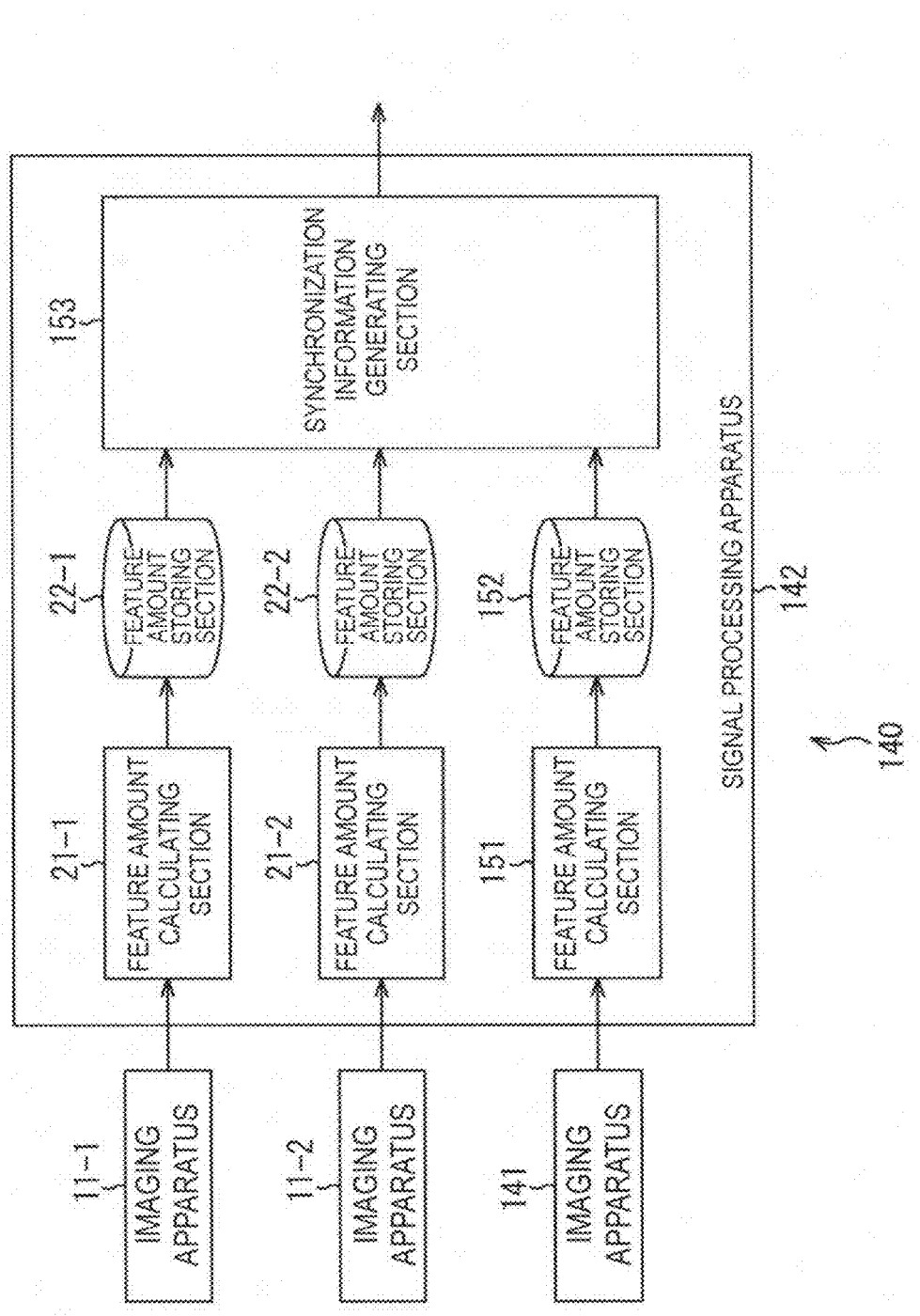
FIG. 11 is a view for explaining an outline of a second embodiment of a signal processing system to which the present disclosure is applied.

FIG. 11 is a view for explaining an outline of the second embodiment of the signal processing system to which the present disclosure is applied.

In components illustrated in FIG. 11, the same reference numerals are assigned to the same components as in FIG. 1. An overlapping explanation will be adequately omitted.

A configuration of a signal processing system 140 in FIG. 11 differs from the configuration of FIG. 1 in that an imaging apparatus 141 is newly set and a signal processing apparatus 142 is set instead of the signal processing apparatus 12. The signal processing system 140 generates synchronization information of contents acquired by three imaging apparatuses.

To be more specific, similar to the imaging apparatus 11, the imaging apparatus 141 of the signal processing system 140 includes a video camera or the like. The imaging apparatus 141 acquires a dynamic image and sound of the identical event, which are different from those of the imaging apparatuses 11-1 and 11-2. Similar to the imaging apparatus 11, the imaging apparatus 141 transmits a content C of the resulting dynamic image and sound to the signal processing apparatus 142.

The signal processing apparatus 142 includes the feature amount calculating section 21-1, the feature amount calculating section 21-2, a feature amount calculating section 151, the feature amount storing section 22-1, the feature amount storing section 22-2, a feature amount storing section 152 and a synchronization information generating section 153.

The feature amount calculating section 151 is configured in the same way as the feature amount calculating section 21 in FIG. 2. The feature amount calculating section 151 calculates feature amount time series data based on the acoustic data of the content C supplied from the imaging apparatus 141 and supplies the time-series data to the feature amount storing section 152. The feature amount storing section 152 includes a memory and a hard disk, and so on, and stores the feature amount time series data of the content C, which is supplied from the feature amount calculating section 151.

The synchronization information generating section 153 reads the feature amount time series data of the content A from the feature amount storing section 22-1, reads the feature amount time series data of the content B from the feature amount storing section 22-2 and reads the feature amount time series data of the content C from the feature amount storing section 152. Similar to the synchronization information generating section 23, the synchronization information generating section 153 generates synchronization information used at the time of synchronizing the contents A and B, based on the feature amount time series data of the content A and the feature amount time series data of the content B.

Also, similar to the synchronization information generating section 23, the synchronization information generating section 153 generates synchronization information used at the time of synchronizing the contents A and C, based on the feature amount time series data of the content A and the feature amount time series data of the content C. The synchronization information generating section 153 outputs the synchronization information of the contents A and B and the synchronization information of the contents A and C.

Also, the synchronization information generating section 153 may generate synchronization information of other combinations than the combination of the contents A and B and the combination of the contents A and C. Also, the synchronization information generating section 153 generates synchronization information of the contents B and C and compares the synchronization information of the contents B and C with the synchronization of the contents A and B and the synchronization information of the contents A and C, thereby increasing the accuracy of synchronization information.

Third Embodiment

[Configuration Example of Signal Processing System]

Figure 12:
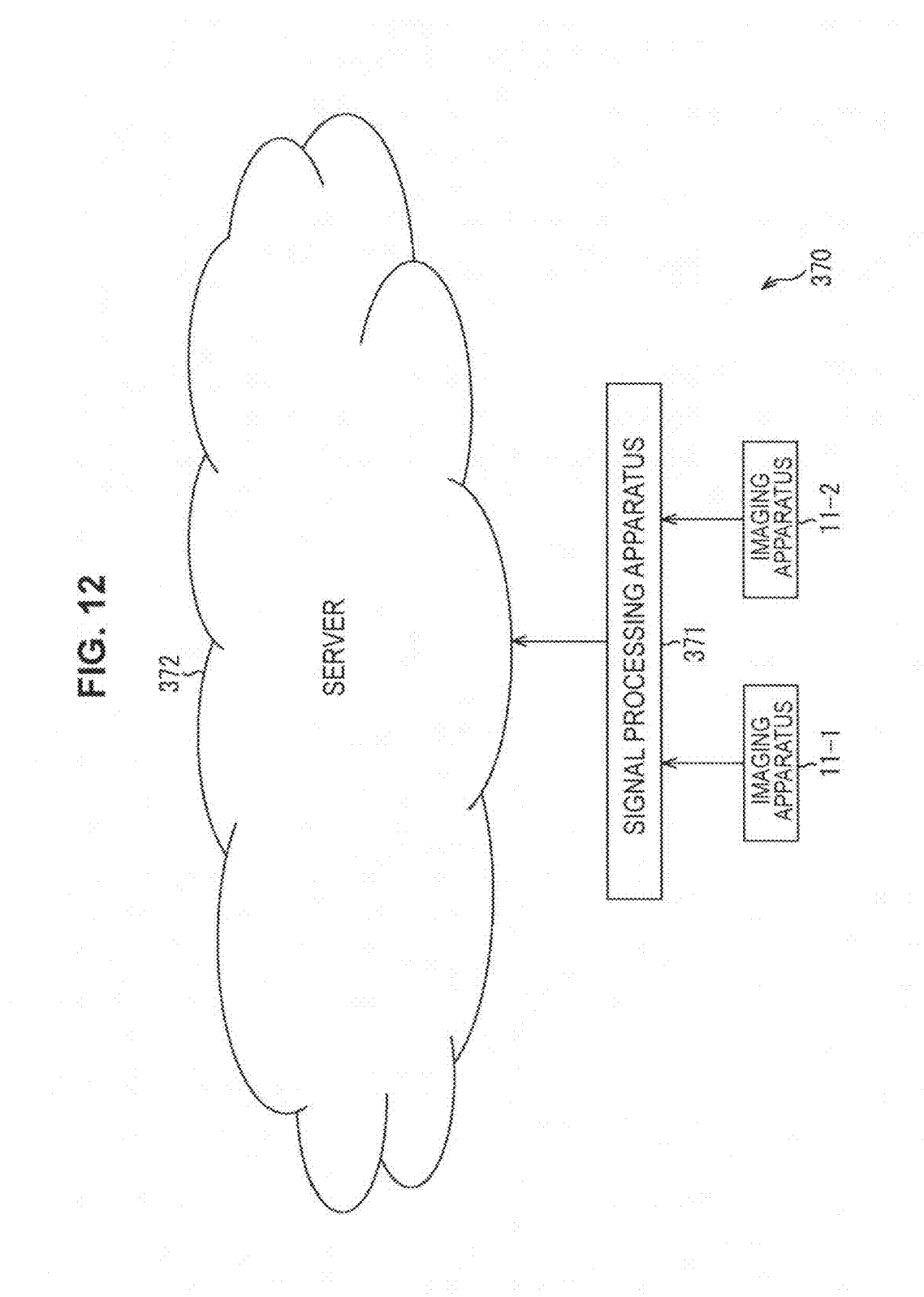
FIG. 12 is a view for explaining an outline of a third embodiment of a signal processing system to which the present disclosure is applied.

FIG. 12 is a view for explaining an outline of the third embodiment of the signal processing system to which the present disclosure is applied.

Here, in the components illustrated in FIG. 12, the same reference numerals are assigned to the same components as in FIG. 1. An overlapping explanation will be adequately omitted.

A signal processing system 370 in FIG. 12 includes the imaging apparatuses 11-1 and 11-2, a signal processing apparatus 371 and a server 372.

The signal processing apparatus 371 includes the feature amount extracting sections 21-1 and 21-2 in FIG. 1. The signal processing apparatus 371 calculates feature amount time series data based on the acoustic data of the content A supplied from the imaging apparatus 11-1, and calculates feature amount time series data based on the acoustic data of the content A supplied from the imaging apparatus 11-2. The signal processing apparatus 371 transmits the feature amount time series data of the contents A and B to the server 372.

The server 372 includes the feature amount storing sections 22-1 and 22-2 and the synchronization information generating section 23 in FIG. 1. The server 372 receives and stores the feature amount time series data of the content A transmitted from the signal processing apparatus 371, and receives and stores the feature amount time series data of the content B. The server 372 reads the feature amount time series data of the content A and the feature amount time series data of the content B, generates synchronization information based on the feature amount time series data of the content A and the feature amount time series data of the content B, and outputs the synchronization information.

Also, assignment of the functions of the signal processing apparatus 371 and the server 372 are not limited to the above assignment. For example, the signal processing apparatus 371 may store the time-series data of the contents A and B and read and transmit them to the server 372.

Also, in the first to third embodiments, although the frequency band dividing section 101 divides acoustic data into four frequency bands, the division number is not limited to four and the acoustic data may not be subjected to band division.

[Configuration Example of Feature Amount Calculating Section]

Figure 13:
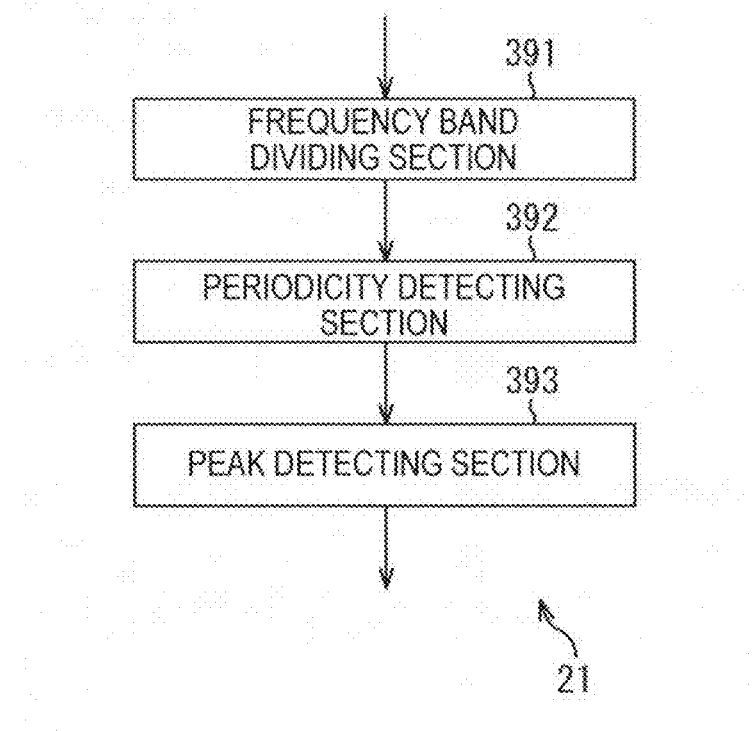
FIG. 13 is a block diagram illustrating another configuration example of a feature amount calculating section.

FIG. 13 illustrates a configuration example of the feature amount calculating section 21 in a case where acoustic data is not subjected to band division.

The feature amount calculating section 21 in FIG. 13 includes a frequency band dividing section 391, a periodicity detecting section 392 and a peak detecting section 393.

The frequency band dividing section 391 divides the acoustic data of the contents supplied from the imaging apparatus 11 in FIG. 1, into time intervals of around several tens of milliseconds to a hundred milliseconds, using a window function, and supplies the acoustic data of the time intervals to the periodicity detecting section 392.

The periodicity detecting section 392 extracts periodicity information of time intervals by calculating an autocorrelation function $x(b,\tau)$ of the acoustic data of time intervals supplied from the frequency band dividing section 391. The periodicity detecting section 392 supplies the extracted periodicity information of time intervals to the peak detecting section 393.

The peak detecting section 393 performs peak detection on the periodicity information supplied in each time interval from the periodicity detecting section 392 and generates peak information $p(\tau)$.

Here, in a case where periodicity information in the peak position $\tau_p$ is less than a predetermined threshold, the peak detecting section 393 may set peak information $P(\tau_p)$ in the peak position $\tau_p$ to 0. By this means, it is possible to reduce a noise of the peak information $P(\tau_p)$.

The peak detecting section 393 outputs the peak information $P(\tau)$ of time intervals as feature amount time series data of time intervals.

Here, as a feature amount, it is possible to adopt information such as an acoustic data level and a rising position of the acoustic data level in addition to the peak information $P(\tau)$.

For example, in the case of using acoustic data level information as a feature amount, the acoustic data is divided into time intervals of several tens of milliseconds and an RMS (Root Mean Square) value or average value of the acoustic data per time interval is calculated as feature amount time series data. Subsequently, a mutual correlation function between the feature amount time series data is calculated as a similarity.

Here, in this case, level information of acoustic data divided into a plurality of frequency bands by band-pass filters may be used as a feature amount. In this case, the mutual correlation function is calculated every frequency band and a total sum of the mutual correlation functions of the frequency bands is calculated as a similarity.

Also, in a case where information of a rising position of an acoustic data level is used as a feature amount, for example, the feature amount is information in which a value in the rising position of acoustic data, that is, a value in a position with a differential value equal to or greater than a threshold is 1 and values in other positions are 0.

Also, as a feature amount, it is possible to use Zero Crossing Rate, SpectrumFlux, Spectrum Centroid or Roll-Off alone or in combination, among feature amounts disclosed in George Tzanetakis and Perry Cook, Musical genre classification of audio signals, IEEE Transactions on Speech and Audio Processing, 10(5): 293-302, July 2002. In the case of using these feature amounts in combination, the mutual correlation function of each feature amount is calculated as a similarity.

Further, as a feature amount, instead of the above information itself, it is possible to use information in which, among peak positions of the information, that is, among positions in which a differential value changes from a positive value to a negative value, a value in a position with a level equal to or greater than a threshold is 1 and values in other positions are 0.

Also, the apparatuses to acquire contents in the first to third embodiments may be an apparatus to acquire at least acoustic data, and a recording apparatus such as an IC (Integrated Circuit) recorder is possible.

<Explanation of Computer to Which the Present Disclosure is Applied>

[Configuration Example of Computer]

The above series of processing by the signal processing apparatus or the server can be performed by hardware or software. In the case of performing the series of processing by software, programs forming the software are installed in a computer. Here, the computer includes a computer mounted in dedicated hardware or a general-purpose personal computer that can execute various functions by installing various programs.

Figure 14:
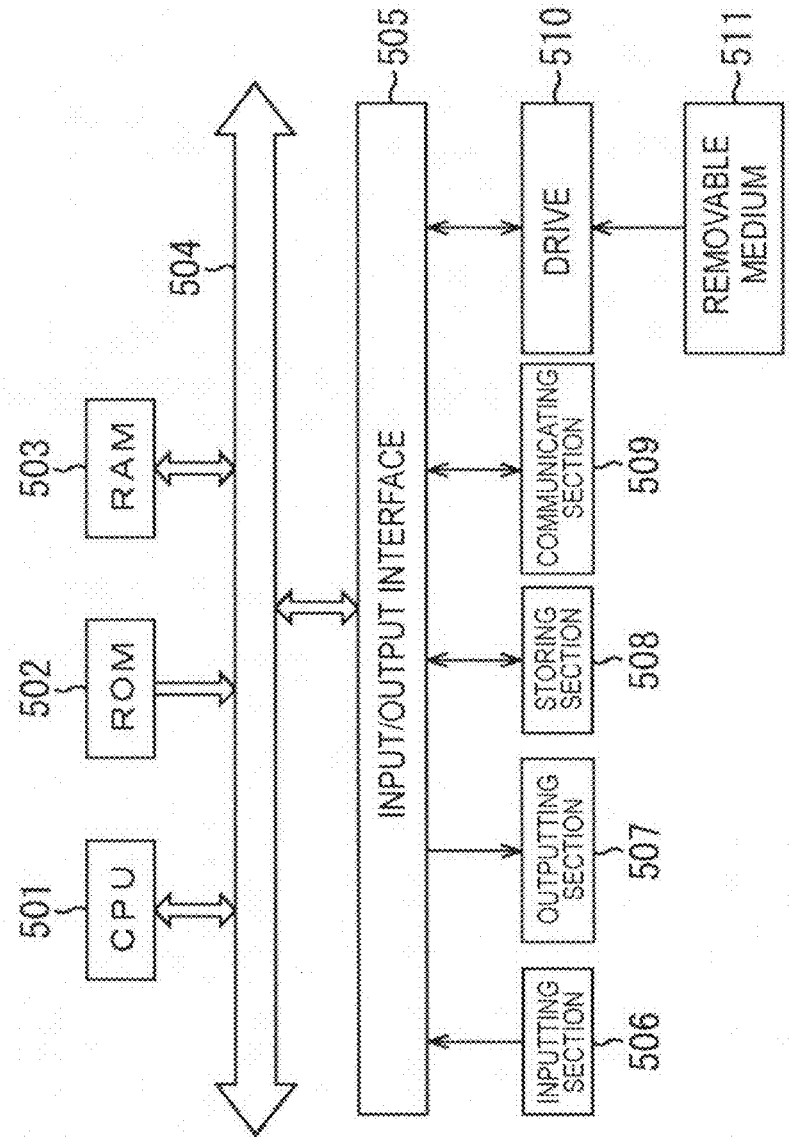
FIG. 14 is a block diagram illustrating a configuration example of hardware of a computer.

FIG. 14 is a block diagram illustrating a configuration example of hardware of a computer that executes the above series of processing by programs.

In the computer, a CPU (Central Processing Unit) 501, a ROM (Read Only Memory) 502 and a RAM (Random Access Memory) 503 are connected to each other via a bus 504.

The bus 504 is further connected to an input/output interface 505. The input/output interface 505 is connected to an inputting section 506, an outputting section 507, a storing section 508, a communicating section 509 and a drive 510.

The inputting section 506 includes a keyboard, a mouse and a microphone, and so on. The outputting section 507 includes a display and a speaker, and so on. The storing section 508 includes a hard disk and a nonvolatile memory, and so on. The communicating section 509 includes a network interface and so on. The drive 510 drives removable medium 511 such as a magnetic disk, an optical disk, a magnetic-optical disk and a semiconductor memory.

In the computer configured as above, for example, the CPU 501 loads the programs stored in the storing section 508 onto the RAM 503 via the input/output interface 505 and the bus 504 and executes the programs, thereby performing the above series of processing.

The programs executed by the computer (i.e. CPU 501) can be recorded in the removable medium 511 such as a package medium and provided. Also, the programs can be provided via a wired or wireless transmission medium such as a local area network, the Internet and digital satellite broadcasting.

In the computer, by attaching the removable medium 511 to the drive 510, it is possible to install the programs in the storing section 508 via the input/output interface 505. Also, it is possible to receive the programs in the communicating section 509 via the wired or wireless transmission medium and install them in the storing section 508. In addition, it is possible to install the programs in advance in the ROM 502 or the storing section 508.

Also, the programs executed by the computer may be programs to perform processing in chronological order along the order explained in the present specification, or may be programs performed in parallel or at requested timings such as the time when a calling is performed.

Also, in the present specification, a system denotes an aggregation of multiple components (such as an apparatus and a module (i.e. part)), and it does not matter whether all components are in the identical chassis. Therefore, a plurality of apparatuses stored in difference chassis and connected via a network, and one apparatus in which a plurality of modules are stored in one chassis, are equivalent to the system.

It should be understood by those skilled in the art that various modifications, combinations, sub-combinations and alterations may occur depending on design requirements and other factors insofar as they are within the scope of the appended claims or the equivalents thereof.

For example, in the signal processing system 10 according to the first embodiment and the signal processing system 370 according to the third embodiment, the number of imaging apparatuses may be three or more. Also, in the signal processing system 10 according to the first embodiment and the signal processing system 140 according to the second embodiment, feature amount time series data may not be stored in the signal processing apparatus but may be stored in, for example, a server outside the signal processing apparatus.

Additionally, the present technology may also be configured as below.

(1) A signal processing apparatus including:

a first periodicity detecting section detecting periodicity information of an acoustic signal included in a first content, as first periodicity information;

a second periodicity detecting section detecting the periodicity information of an acoustic signal included in a second content, as second periodicity information;

a similarity calculating section calculating a similarity between the first periodicity information detected by the first periodicity detecting section and the second periodicity information detected by the second periodicity detecting section; and a synchronization information generating section generating synchronization information used at a time of synchronizing the first content and the second content, based on the similarity calculated by the similarity calculating section.

(2) The signal processing apparatus according to (1), further including:

a first band dividing section performing a band division on an acoustic signal included in the first content;

a second band dividing section performing a band division on an acoustic signal included in the second content;

a first periodicity information integrating section integrating the first periodicity information of all bands; and a second periodicity information integrating section integrating the second periodicity information of all bands, wherein the first periodicity detecting section detects the periodicity information of the acoustic signal subjected to the band division by the first band dividing section, in each band, as the first periodicity information;

wherein the second periodicity detecting section detects the periodicity information of the acoustic signal subjected to the band division by the second band dividing section, in each band, as the second periodicity information;

wherein the first periodicity information integrating section integrates the first periodicity information of the all bands detected by the first periodicity detecting section; and wherein the second periodicity information integrating section integrates the second periodicity information of the all bands detected by the second periodicity detecting section.

(3) The signal processing apparatus according to (2), further including:

a first periodicity intensity detecting section detecting an intensity of the first periodicity information detected by the first periodicity detecting section; and a second periodicity intensity detecting section detecting an intensity of the second periodicity information detected by the second periodicity detecting section, wherein the first periodicity information integrating section integrates the first periodicity information of the all bands based on the intensity of the first periodicity information detected by the first periodicity intensity detecting section; and wherein the second periodicity information integrating section integrates the second periodicity information of the all bands based on the intensity of the second periodicity information detected by the second periodicity intensity detecting section.

(4) The signal processing apparatus according to any one of (1) to (3), wherein the similarity calculating section calculates a similarity per time interval between the first periodicity information and the second periodicity information; and wherein the synchronization information generating section generates the synchronization information per time interval, based on the similarity per time interval.

(5) The signal processing apparatus according to (4), wherein the similarity calculating section generates a similarity matrix indicating the similarity per time interval between the first periodicity information and the second periodicity information; and wherein the synchronization information generating section generates information indicating an optical path on the similarity matrix, as the synchronization information.

(6) The signal processing apparatus according to any one of (1) to (5), wherein the first periodicity information is an autocorrelation function of the acoustic signal included in the first content; and wherein the second periodicity information is an autocorrelation function of the acoustic signal included in the second content.

(7) A signal processing method in a signal processing apparatus, including:

a first periodicity detecting step of detecting periodicity information of an acoustic signal included in a first content, as first periodicity information;

a second periodicity detecting step of detecting the periodicity information of an acoustic signal included in a second content, as second periodicity information;

a similarity calculating step of calculating a similarity between the first periodicity information detected by processing in the first periodicity detecting step and the second periodicity information detected by processing in the second periodicity detecting step; and a synchronization information generating step of generating synchronization information used at a time of synchronizing the first content and the second content, based on the similarity calculated by processing in the similarity calculating step.

(8) A program that causes a computer to function as:

a first periodicity detecting section detecting periodicity information of an acoustic signal included in a first content, as first periodicity information;

a second periodicity detecting section detecting the periodicity information of an acoustic signal included in a second content, as second periodicity information;

a similarity calculating section calculating a similarity between the first periodicity information detected by the first periodicity detecting section and the second periodicity information detected by the second periodicity detecting section; and a synchronization information generating section generating synchronization information used at a time of synchronizing the first content and the second content, based on the similarity calculated by the similarity calculating section.

(9) An electronic device including:

a first periodicity detecting section detecting periodicity information of an acoustic signal included in a first content, as first periodicity information;

a second periodicity detecting section detecting the periodicity information of an acoustic signal included in a second content, as second periodicity information;

a similarity calculating section calculating a similarity between the first periodicity information detected by the first periodicity detecting section and the second periodicity information detected by the second periodicity detecting section; and a synchronization information generating section generating synchronization information used at a time of synchronizing the first content and the second content, based on the similarity calculated by the similarity calculating section.

(10) A signal processing apparatus including:

a receiving section receiving first periodicity information corresponding to periodicity information of an acoustic signal included in a first content, and second periodicity information corresponding to the periodicity information of an acoustic signal included in a second content;

a similarity calculating section calculating a similarity between the first periodicity information and the second periodicity information received by the receiving section; and a synchronization information generating section generating synchronization information used at a time of synchronizing the first content and the second content, based on the similarity calculated by the similarity calculating section.

(11) A signal processing method in a signal processing apparatus, including:

a receiving step of receiving first periodicity information corresponding to periodicity information of an acoustic signal included in a first content, and second periodicity information corresponding to the periodicity information of an acoustic signal included in a second content;

a similarity calculating step of calculating a similarity between the first periodicity information and the second periodicity information received by processing in the receiving step; and a synchronization information generating step of generating synchronization information used at a time of synchronizing the first content and the second content, based on the similarity calculated by processing in the similarity calculating step.

(12) A program that causes a computer to function as:

a receiving section receiving first periodicity information corresponding to periodicity information of an acoustic signal included in a first content, and second periodicity information corresponding to the periodicity information of an acoustic signal included in a second content;

a similarity calculating section calculating a similarity between the first periodicity information and the second periodicity information received by the receiving section; and a synchronization information generating section generating synchronization information used at a time of synchronizing the first content and the second content, based on the similarity calculated by the similarity calculating section.

(13) An electronic device including:

a receiving section receiving first periodicity information corresponding to periodicity information of an acoustic signal included in a first content, and second periodicity information corresponding to the periodicity information of an acoustic signal included in a second content;

a similarity calculating section calculating a similarity between the first periodicity information and the second periodicity information received by the receiving section; and a synchronization information generating section generating synchronization information used at a time of synchronizing the first content and the second content, based on the similarity calculated by the similarity calculating section.

(14) A signal processing system including:

a first periodicity detecting section detecting periodicity information of an acoustic signal included in a first content, as first periodicity information;

a second periodicity detecting section detecting the periodicity information of an acoustic signal included in a second content, as second periodicity information;

a similarity calculating section calculating a similarity between the first periodicity information detected by the first periodicity detecting section and the second periodicity information detected by the second periodicity detecting section; and a synchronization information generating section generating synchronization information used at a time of synchronizing the first content and the second content, based on the similarity calculated by the similarity calculating section.

(15) A signal processing method in a signal processing system, including:

a first periodicity detecting step of detecting periodicity information of an acoustic signal included in a first content, as first periodicity information;

a second periodicity detecting step of detecting the periodicity information of an acoustic signal included in a second content, as second periodicity information;

a similarity calculating step of calculating a similarity between the first periodicity information detected by processing in the first periodicity detecting step and the second periodicity information detected by processing in the second periodicity detecting step; and a synchronization information generating step of generating synchronization information used at a time of synchronizing the first content and the second content, based on the similarity calculated by processing in the similarity calculating step.

(16) A signal processing apparatus including:
- a first band dividing section performing a band division on an acoustic signal included in a first content;
- a first periodicity detecting section detecting periodicity information of the acoustic signal subjected to the band division by the first band dividing section, as first periodicity information;
- a first periodicity intensity detecting section detecting an intensity of the first periodicity information detected by the first periodicity detecting section;
- a first periodicity information integrating section integrating the first periodicity information of all bands, based on the intensity of the first periodicity information detected by the first periodicity intensity detecting section;
- a second band dividing section performing a band division on an acoustic signal included in a second content;
- a second periodicity detecting section detecting the periodicity information of the acoustic signal subjected to the band division by the second band dividing section, as second periodicity information;
- a second periodicity intensity detecting section detecting an intensity of the second periodicity information detected by the second periodicity detecting section;
- a second periodicity information integrating section integrating the second periodicity information of all bands, based on the intensity of the second periodicity information detected by the second periodicity intensity detecting section;
- a similarity calculating section calculating a similarity between the first periodicity information integrated by the first periodicity information integrating section and the second periodicity information integrated by the second periodicity information integrating section; and
- a synchronization information generating section generating synchronization information used at a time of synchronizing the first content and the second content, based on the similarity calculated by the similarity calculating section.

The present disclosure contains subject matter related to that disclosed in Japanese Priority Patent Application JP 2012-039765 filed in the Japan Patent Office on Feb. 27, 2012, the entire content of which is hereby incorporated by reference.

What is claimed is:

1. A signal processing apparatus comprising:
   - a first periodicity detecting section detecting periodicity information of an acoustic signal included in a first content, as first periodicity information;
   - a second periodicity detecting section detecting periodicity information of an acoustic signal included in a second content, as second periodicity information;
   - a similarity calculating section calculating a similarity between the first periodicity information detected by the first periodicity detecting section and the second periodicity information detected by the second periodicity detecting section; and
   - a synchronization information generating section generating synchronization information used at a time of synchronizing the first content and the second content, based on the similarity calculated by the similarity calculating section.

2. The signal processing apparatus according to claim 1, further comprising:
   - a first band dividing section performing a band division on an acoustic signal included in the first content;
   - a second band dividing section performing a band division on an acoustic signal included in the second content;
   - a first periodicity information integrating section integrating the first periodicity information of all bands; and
   - a second periodicity information integrating section integrating the second periodicity information of all bands,
   - wherein the first periodicity detecting section detects the periodicity information of the acoustic signal subjected to the band division by the first band dividing section, in each band, as the first periodicity information;
   - wherein the second periodicity detecting section detects the periodicity information of the acoustic signal subjected to the band division by the second band dividing section, in each band, as the second periodicity information;
   - wherein the first periodicity information integrating section integrates the first periodicity information of the all bands detected by the first periodicity detecting section; and
   - wherein the second periodicity information integrating section integrates the second periodicity information of the all bands detected by the second periodicity detecting section.

3. The signal processing apparatus according to claim 2, further comprising:
   - a first periodicity intensity detecting section detecting an intensity of the first periodicity information detected by the first periodicity detecting section; and
   - a second periodicity intensity detecting section detecting an intensity of the second periodicity information detected by the second periodicity detecting section,
   - wherein the first periodicity information integrating section integrates the first periodicity information of the all bands based on the intensity of the first periodicity information detected by the first periodicity intensity detecting section; and
   - wherein the second periodicity information integrating section integrates the second periodicity information of the all bands based on the intensity of the second periodicity information detected by the second periodicity intensity detecting section.

4. The signal processing apparatus according to claim 1,
   - wherein the similarity calculating section calculates a similarity per time interval between the first periodicity information and the second periodicity information; and
   - wherein the synchronization information generating section generates the synchronization information per time interval, based on the similarity per time interval.

5. The signal processing apparatus according to claim 4,
   - wherein the similarity calculating section generates a similarity matrix indicating the similarity per time interval between the first periodicity information and the second periodicity information; and
   - wherein the synchronization information generating section generates information indicating an optical path on the similarity matrix, as the synchronization information.

6. The signal processing apparatus according to claim 1,
   - wherein the first periodicity information is an autocorrelation function of the acoustic signal included in the first content; and
   - wherein the second periodicity information is an autocorrelation function of the acoustic signal included in the second content.

7. A signal processing method in a signal processing apparatus comprising one or more processors, wherein the one or more processors perform the method comprising:

detecting periodicity information of an acoustic signal included in a first content, as first periodicity information;

detecting periodicity information of an acoustic signal included in a second content, as second periodicity information;

calculating a similarity between the detected first periodicity information and the detected second periodicity information; and generating synchronization information used at a time of synchronizing the first content and the second content, based on the calculated similarity.

8. A non-transitory computer-readable storage medium, having stored thereon, a set of computer-executable instructions that causes a computer to perform the steps comprising:

detecting periodicity information of an acoustic signal included in a first content, as first periodicity information;

detecting periodicity information of an acoustic signal included in a second content, as second periodicity information;

calculating a similarity between the detected first periodicity information and the detected second periodicity information; and generating synchronization information used at a time of synchronizing the first content and the second content, based on the calculated similarity.

* * * * *